(12) United States Patent
Chen

(10) Patent No.: US 11,294,174 B2
(45) Date of Patent: Apr. 5, 2022

(54) VIRTUAL IMAGE DISPLAY APPARATUS, AND METHOD FOR REDUCING IN REAL TIME IMAGING DISTORTION IN VIRTUAL IMAGE DISPLAYED BY VIRTUAL IMAGE DISPLAY APPARATUS

(71) Applicant: BOE Technology Group Co., Ltd., Beijing (CN)

(72) Inventor: Yanjun Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 497 days.

(21) Appl. No.: 16/330,872

(22) PCT Filed: Jun. 8, 2018

(86) PCT No.: PCT/CN2018/090419
§ 371 (c)(1),
(2) Date: Mar. 6, 2019

(87) PCT Pub. No.: WO2019/134345
PCT Pub. Date: Jul. 11, 2019

(65) Prior Publication Data
US 2021/0325670 A1 Oct. 21, 2021

(30) Foreign Application Priority Data
Jan. 5, 2018 (CN) .......................... 201810012510.9

(51) Int. Cl.
*G02B 27/14* (2006.01)
*G03H 1/00* (2006.01)
(Continued)

(52) U.S. Cl.
CPC .......... *G02B 27/0101* (2013.01); *B60K 35/00* (2013.01); *G01J 9/00* (2013.01);
(Continued)

(58) Field of Classification Search
CPC ....... A61B 3/113; A61B 3/103; A61B 3/1225; G01S 11/12; G01S 1/02; A01B 69/001;
(Continued)

(56) References Cited

U.S. PATENT DOCUMENTS 10,619,748 B1\* 4/2020 Majumdar .............. F16K 11/20
2007/0019159 A1\* 1/2007 Nakanishi ................ A61B 3/15
351/206

(Continued)

FOREIGN PATENT DOCUMENTS

| CN | 106133803 A | 11/2016 |
| DE | 102013218085 A1 | 3/2015 |
| WO | 2008052730 A1 | 5/2008 |

OTHER PUBLICATIONS

Third Office Action in the Chinese Patent Application No. 201810012510.9, dated Oct. 12, 2020; English translation attached.

*Primary Examiner* — Dawayne Pinkney
(74) *Attorney, Agent, or Firm* — Intellectual Valley Law, P.C.

(57) ABSTRACT

The present application provides a virtual image display apparatus. The virtual image display apparatus includes an image source configured to produce imaging illumination; an optical relay configured to receive the imaging illumination from the image source, and configured to transmit a detection light having an aberrated wavefront representing imaging distortion in a virtual image displayed by the virtual image display apparatus; a wavefront sensor configured to receive the detection light, and configured to detect wavefront aberration information from the detection light; and a wavefront correction processor configured to receive the wavefront aberration information from the wavefront sensor, and configured to adjust in real time the imaging (Continued)

illumination produced by the image source to reduce the imaging distortion in real time.

20 Claims, 9 Drawing Sheets

(51) Int. Cl.
  *G09G 5/00* (2006.01)
  *H04N 7/00* (2011.01)
  *G02F 1/1335* (2006.01)
  *G02B 27/01* (2006.01)
  *B60K 35/00* (2006.01)
  *G01J 9/00* (2006.01)

(52) U.S. Cl.
  CPC .. *B60K 2370/1529* (2019.05); *B60K 2370/21* (2019.05); *B60K 2370/23* (2019.05); *B60K 2370/25* (2019.05); *B60K 2370/31* (2019.05); *G01J 2009/002* (2013.01); *G02B 2027/011* (2013.01); *G02B 2027/014* (2013.01); *G02B 2027/0114* (2013.01)

(58) Field of Classification Search
  CPC .............. G02B 27/144; G02B 27/0172; G02B 27/145; G02B 27/1013; G02B 27/0149; G02B 27/0103; G02B 27/0101; G02B 27/017; G02B 27/01; G09G 3/003; H04N 7/18; G06T 19/00; G06T 19/006; G05D 1/0038; G05D 1/0246; B60R 1/00
  USPC .... 359/629–636, 618, 639, 13–14; 345/7, 9, 345/632–633, 207; 348/113–120; 349/11; 351/210, 221, 200
  See application file for complete search history.

(56) References Cited

U.S. PATENT DOCUMENTS

| | | | |
|---|---|---|---|
| 2008/0018855 A1* | 1/2008 | Larichev | A61B 3/1015 351/211 |
| 2012/0026466 A1* | 2/2012 | Zhou | A61B 3/102 351/214 |
| 2014/0055749 A1* | 2/2014 | Zhou | A61B 3/14 351/214 |
| 2017/0154554 A1 | 6/2017 | Tanaka et al. | |

* cited by examiner

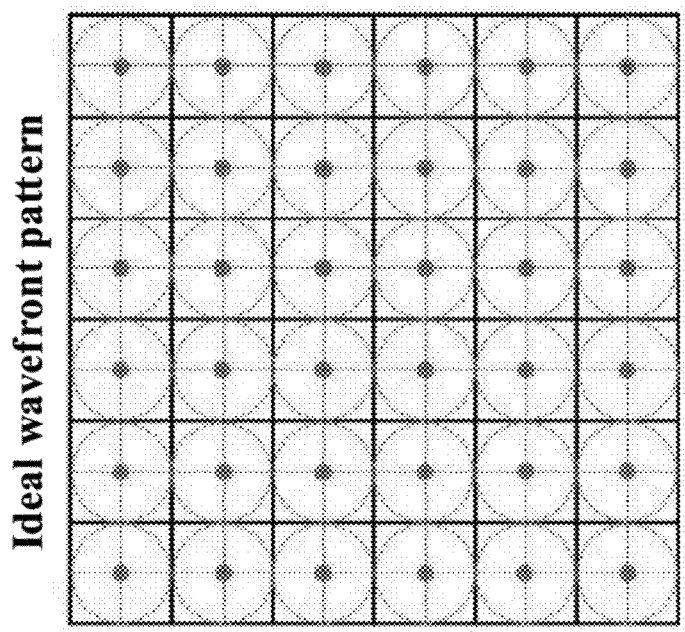
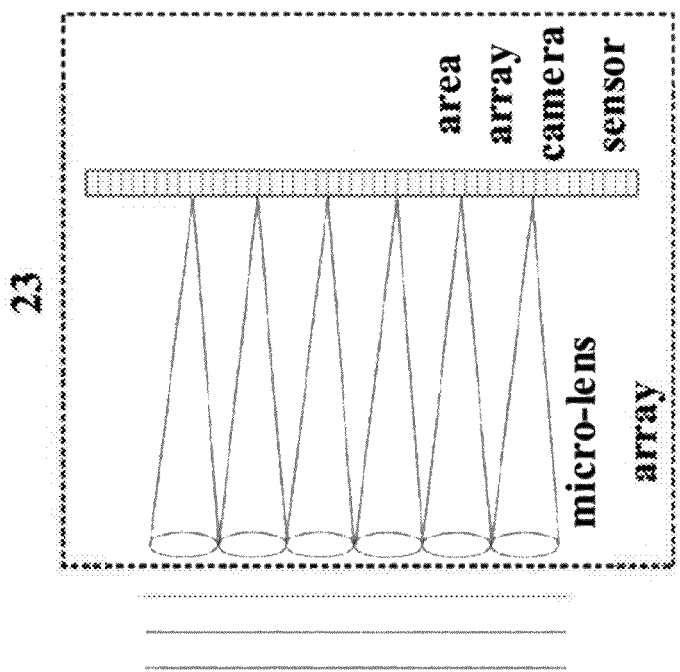
FIG. 3A

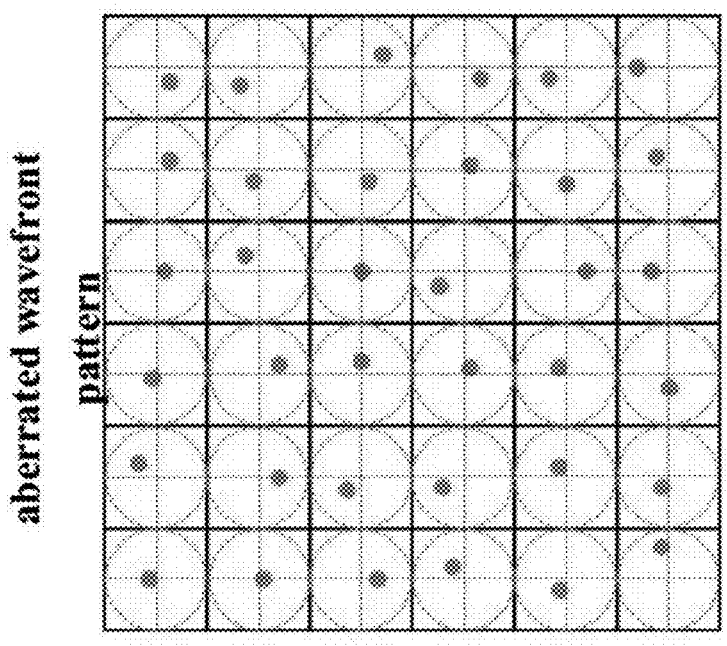
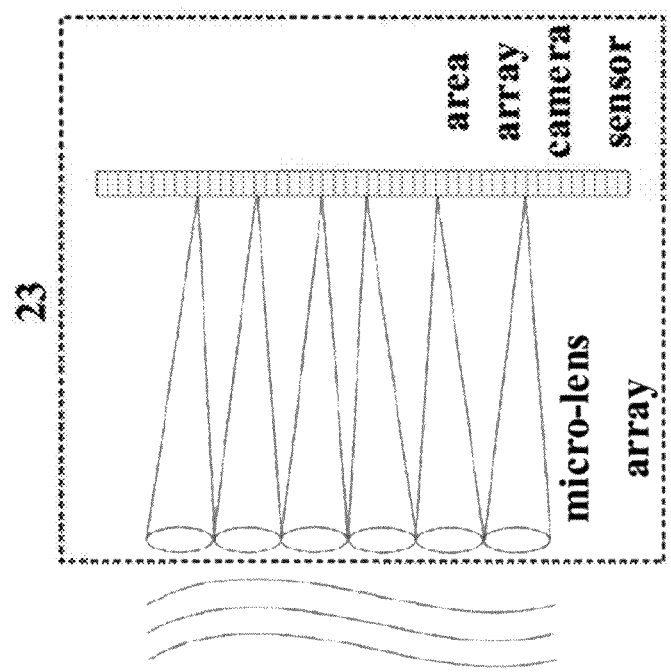
FIG. 3B

VIRTUAL IMAGE DISPLAY APPARATUS, AND METHOD FOR REDUCING IN REAL TIME IMAGING DISTORTION IN VIRTUAL IMAGE DISPLAYED BY VIRTUAL IMAGE DISPLAY APPARATUS

CROSS-REFERENCE TO RELATED APPLICATION

This application is a national stage application under 35 U.S.C. § 371 of International Application No. PCT/CN2018/090419, filed Jun. 08, 2018, which claims priority to Chinese Patent Application No. 201810012510.9, filed Jan. 5, 2018, the contents of which are incorporated by reference in the entirety.

TECHNICAL FIELD

The present invention relates to display technology, more particularly, to a virtual image display apparatus, and a method for reducing in real time imaging distortion in a virtual image displayed by a virtual image display apparatus.

BACKGROUND

A virtual image display apparatuses such as a head-up display apparatus has found many applications. For example, the head-up display apparatus has been used in motor vehicles for display driving-related information. This makes it easier for a driver to monitor various important driving parameters. In some cases, the head-up display apparatus projects the image onto the windshield, e.g., in a lower region of the driver's field of view. The driver need not divert gaze entirely away from the road in order to perceive the information items presented by a head-up display, but can merely direct his or her gaze slightly downward in order to view the information presented on the head-up display.

SUMMARY

In one aspect, the present invention provides a virtual image display apparatus comprising an image source configured to produce imaging illumination; an optical relay configured to receive the imaging illumination from the image source, and configured to transmit a detection light having an aberrated wavefront representing imaging distortion in a virtual image displayed by the virtual image display apparatus; a wavefront sensor configured to receive the detection light, and configured to detect wavefront aberration information from the detection light; and a wavefront correction processor configured to receive the wavefront aberration information from the wavefront sensor, and configured to adjust in real time the imaging illumination produced by the image source to reduce the imaging distortion in real time.

Optionally, the optical relay comprises a reflective mirror configured to reflect the imaging illumination from the image source to a viewer's eye; and a dichroic mirror between the reflective mirror and the wavefront sensor, and configured to allow the detection light to be transmitted to the wavefront sensor and allow the imaging illumination from the image source to be transmitted to the viewer's eye.

Optionally, the dichroic mirror is configured to reflect the imaging illumination from the image source to the viewer's eye; and configured to allow the detection light to transmit through the dichroic mirror.

Optionally, the virtual image display apparatus further comprises a detection light source configured to produce a detection light, the detection light source being independent from the image source; wherein the reflective mirror is configured to reflect the detection light from the detection light source along a forward optical path, the detection light along the forward optical path being subsequently transmitted to the viewer's eye; and the reflective mirror is configured to reflect the detection light reflected by the viewer's eye along a backward optical path, the detection light along the backward optical path being subsequently transmitted to the wavefront sensor.

Optionally, the optical relay further comprises a beam splitter configured to allow the detection light from the detection light source to be transmitted to the reflective mirror and subsequently to the viewer's eye along the forward optical path, and configured to allow the detection light from the viewer's eye and subsequently reflected by the reflective mirror to be transmitted to the wavefront sensor along the backward optical path.

Optionally, the beam splitter is between the dichroic mirror and the wavefront sensor; and the dichroic mirror is between the beam splitter and the reflective mirror.

Optionally, the dichroic mirror is configured to allow the detection light reflected by the beam splitter to transmit through the dichroic mirror to the reflective mirror along the forward optical path, and configured to allow the detection light reflected by the reflective mirror to transmit through the dichroic mirror to the beam splitter along the backward optical path; and the beam splitter is configured to reflect the detection light from the detection light source to the dichroic mirror along the forward optical path, and configured to allow the detection light from the dichroic mirror to transmit through the beam splitter to the wavefront sensor along the backward optical path.

Optionally, the beam splitter is between the dichroic mirror and the reflective mirror; and the dichroic mirror is between the beam splitter and the wavefront sensor.

Optionally, the beam splitter is configured to allow the imaging illumination reflected by the dichroic mirror to transmit through the beam splitter to the reflective mirror along the forward optical path, and configured to allow the detection light reflected by the reflective mirror to transmit through the beam splitter to the dichroic mirror along the backward optical path; and the dichroic mirror is configured to reflect the imaging illumination from the image source to the beam splitter along the forward optical path, and configured to allow the detection light from the beam splitter to transmit through the dichroic mirror to the wavefront sensor along the backward optical path.

Optionally, the optical relay further comprises an optical isolator between the detection light source and the beam splitter.

Optionally, the detection light source is configured to produce a near infra-red light as the detection light.

Optionally, the dichroic mirror is configured to reflect the detection light to the wavefront sensor and configured to allow the imaging illumination to transmit through the dichroic mirror.

Optionally, the detection light is a light beam of the imaging illumination reflected by the viewer's eye; the reflective mirror is configured to reflect the imaging illumination from the image source along a forward optical path to the dichroic mirror, the dichroic mirror is configured to allow the imaging illumination along the forward optical path to transmit through the dichroic mirror, the detection light along the forward optical path being subsequently transmitted to the viewer's eye; and the dichroic mirror is configured to reflect the detection light reflected by the viewer's eye along a backward optical path, the detection light along the backward optical path being subsequently transmitted to the wavefront sensor.

Optionally, the optical relay further comprises an optical density filter between the dichroic mirror and the wavefront sensor, the optical density filter configured to adjust a light intensity of the detection light transmitted to the wavefront sensor.

Optionally, the optical relay further comprises an optical isolator between the image source and the dichroic mirror.

Optionally, the optical relay further comprises a lens configured to adjust a focus point of the detection light on the wavefront sensor.

Optionally, the wavefront sensor comprises one or a combination of a shack-hartmann wavefront sensor, a holographic wavefront sensor, an optical field sensor, and a complex field sensor.

Optionally, the wavefront correction processor comprises a wavefront reconstruction processor configured to convert an aberrated wavefront pattern generated by the wavefront sensor into a reconstructed wavefront; an aberration analysis processor configured to calculate an aberration coefficient between the reconstructed wavefront and a reference wavefront; a correction coefficient calculation processor configured to calculate an aberration correction coefficient for adjusting a phase of the imaging illumination of the image source; and an image rendering processor configured to calculate phase adjustment parameters based on the aberration correction coefficient, and transmit the phase adjustment parameters to the image source for adjusting in real time the phase of the imaging illumination of the image source, thereby reducing the imaging distortion in in real time.

In another aspect, the present invention provides a vehicle comprising the virtual image display apparatus described herein.

In another aspect, the present invention provides a method for reducing in real time imaging distortion in a virtual image displayed by a virtual image display apparatus, comprising producing imaging illumination by an image source; receiving the imaging illumination from the image source by an optical relay; transmitting a detection light having an aberrated wavefront representing imaging distortion by the optical relay to a wavefront sensor; detecting wavefront aberration information from a detection light by the wavefront sensor; receive the wavefront aberration information from the wavefront sensor by a wavefront correction processor; and adjusting in real time the imaging illumination produced by the image source thereby reducing the imaging distortion in real time.

BRIEF DESCRIPTION OF THE FIGURES

The following drawings are merely examples for illustrative purposes according to various disclosed embodiments and are not intended to limit the scope of the present invention.

FIG. 3A illustrates an ideal wavefront pattern detected by a wavefront sensor in some embodiments according to the present disclosure.

FIG. 3B illustrates an aberrated wavefront pattern detected by a wavefront sensor in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
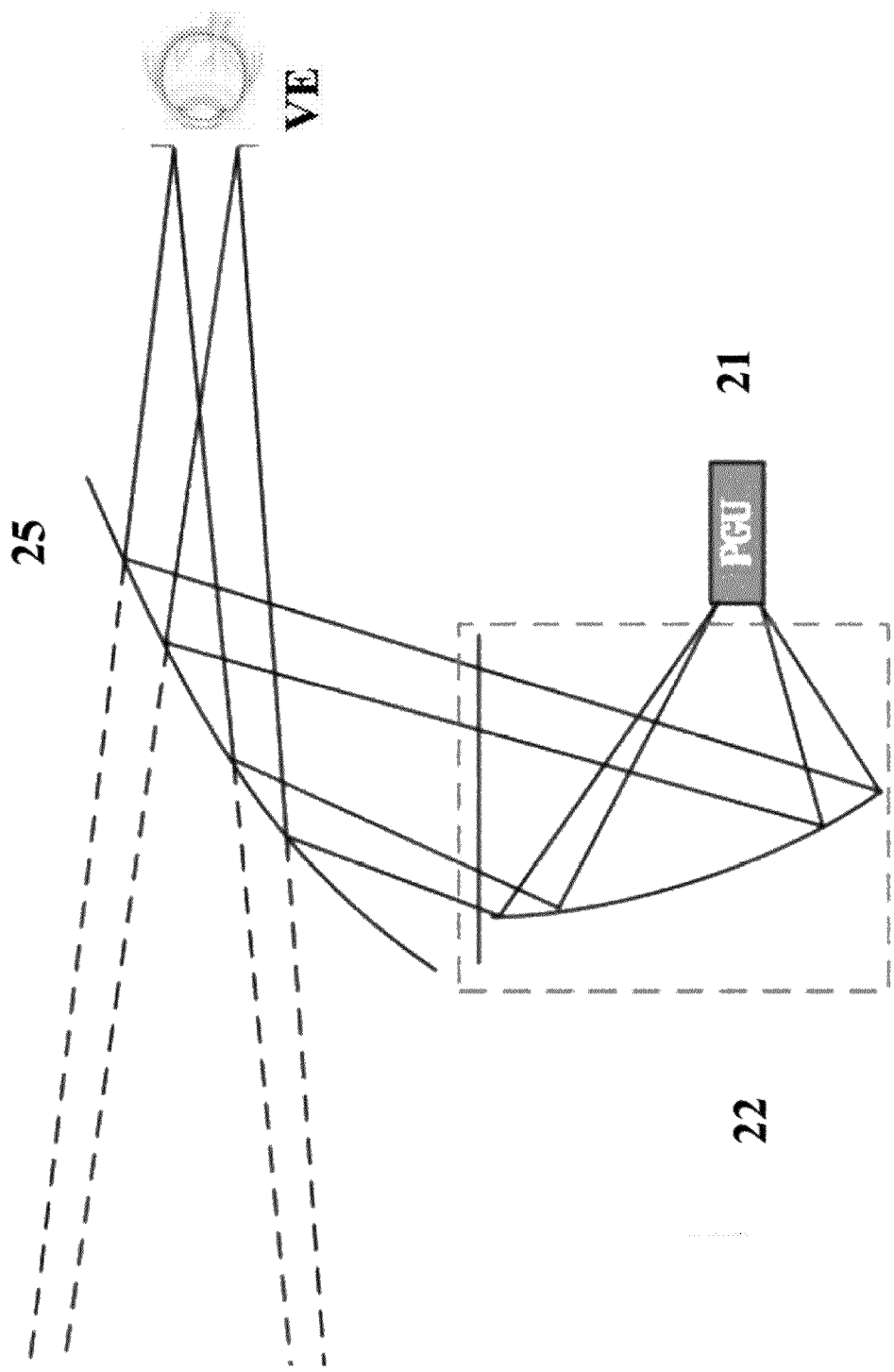
FIG. 1 is a schematic diagram illustrating the structure of a virtual image display apparatus in some embodiments according to the present disclosure.

A head-up display apparatus typically includes an image source, an optical relay, and an optical combiner (e.g., a windshield of a vehicle), for providing a virtual image to a viewer such as a driver of a vehicle. FIG. 1 is a schematic diagram illustrating the structure of a virtual image display apparatus in some embodiments according to the present disclosure. Referring to FIG. 1, the image source 21 is configured to produce imaging illumination. The optical relay 22 is positioned between the image source 21 and the optical combiner 25, and is configured to provide an intermediate image of the image source to the optical combiner 25. The intermediate image is reflected by the optical combiner 25 (e.g., the windshield), thereby presenting a virtual image to a viewer's eye VE.

Optical path in a head-up display apparatus is formed by various components such as the components in the optical relay 22, and the optical combiner 25 (e.g., the windshield). Vehicles of different models manufactured by different companies typically have windshields of different curvatures. To make the head-up display apparatus compatible with the different windshields of different models, the head-up display apparatuses have to be made specifically for each model, e.g., a generic head-up display apparatus cannot be easily fit to vehicles of different models. Even for vehicles of a same model, the curvatures of the windshields for individual vehicles can vary slightly due to manufacture errors. The head-up display apparatus has to be adjusted, for example, by adjusting arrangements of the optical relay components, to reduce imaging distortion. These adds to user inconvenience and manufacturing costs.

In a head-up display apparatus, even if the optical relay uses an off-axis reflection type system, monochromatic aberrations such as spherical aberration, coma aberration, field curvature, astigmatism still exist. It is necessary to correct off-axis aberrations using special-surface aspheric reflection mirrors or free-form surface reflection mirrors, which are difficult to fabricate and demand a high installation accuracy. Moreover, the optical relay needs to be cooperatively optically coupled to the windshield of the vehicle to realize virtual image display, and the astigmatism caused by the curvature of the windshield also affects the imaging result in the eyes of the driver. The head-up display apparatus needs to be adapted to the windshields of different models of vehicles, greatly increasing the cost of production.

Accordingly, the present disclosure provides, inter alia, a virtual image display apparatus, and a method for reducing in real time imaging distortion in a virtual image displayed by a virtual image display apparatus that substantially obviate one or more of the problems due to limitations and disadvantages of the related art. In one aspect, the present disclosure provides a virtual image display apparatus. In some embodiments, the virtual image display apparatus includes an image source configured to produce imaging illumination; an optical relay configured to receive the imaging illumination from the image source, and configured to transmit a detection light having an aberrated wavefront representing imaging distortion in the virtual image displayed by the virtual image display apparatus; a wavefront sensor configured to receive the detection light, and configured to detect wavefront aberration information from the detection light; and a wavefront correction processor configured to receive the wavefront aberration information from the wavefront sensor, and configured to adjust in real time the imaging illumination produced by the image source to reduce the imaging distortion in real time. The present virtual image display apparatus, by having the wavefront sensor to automatically detect imaging distortion and the wavefront correction processor to automatically adjust in real time the imaging illumination produced by the image source to reduce the imaging distortion, the image source can dynamically adjust aberrations of the image. The present virtual image display apparatus can be easily adapted to various types of windshields of different models, thus can be used as a generic virtual image display apparatus suitable for vehicles of different models.

Figure 2:
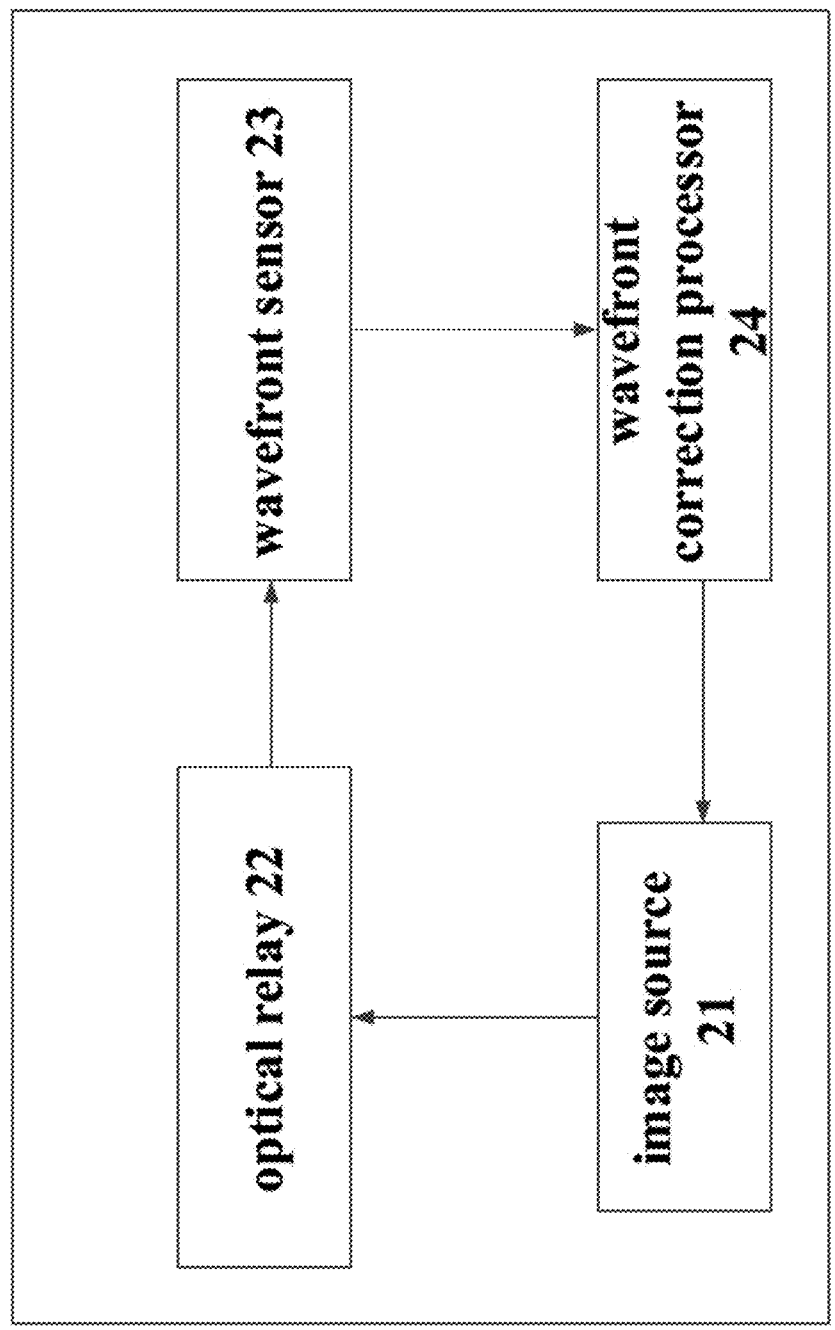
FIG. 2 is a schematic diagram illustrating the structure of a virtual image display apparatus in some embodiments according to the present disclosure.

FIG. 2 is a schematic diagram illustrating the structure of a virtual image display apparatus in some embodiments according to the present disclosure. Referring to FIG. 2, the virtual image display apparatus in some embodiments includes an image source 21, an optical relay 22, a wavefront sensor 23, and a wavefront correction processor 24. The image source 21 is configured to produce imaging illumination. The imaging illumination is transmitted by the optical relay 22 to produce an intermediate image, which is reflected by an optical combiner (e.g., the windshield) to present a virtual image to a viewer's eye. In some embodiments, the image source 21 is further configured to adjust in real time a phase of the imaging illumination, thereby reducing the imaging distortion in the virtual image displayed by the virtual image display apparatus in real time. Optionally, the virtual image display apparatus further includes an aberration adjustment device coupled to the image source 21 to adjust in real time the phase of the imaging illumination.

In some embodiments, the optical relay 22 is configured to receive the imaging illumination from the image source 21, and configured to transmit a detection light having an aberrated wavefront representing imaging distortion in the virtual image displayed by the virtual image display apparatus. Optionally, the optical relay 22 is configured to transmit the detection light having an aberrated wavefront representing the imaging distortion in the virtual image displayed by the virtual image display apparatus to the wavefront sensor 23. Optionally, the detection light is transmitted to a viewer's eye along a same optical path of the imaging illumination, the detection light is then reflected by a viewer's eye and is transmitted along the same optical path in a reversed direction through the optical relay 22 to the wavefront sensor 23.

In some embodiments, the wavefront sensor 23 is configured to receive the detection light, and configured to detect wavefront aberration information from the detection light. Optionally, the wavefront sensor 23 is configured to convert the detection light into an aberrated wavefront pattern, and configured to transmit the aberrated wavefront pattern to the wavefront correction processor 24. Various appropriate wavefront sensors may be used in the present virtual image display apparatus. Examples of appropriate wavefront sensors include a shack-hartmann wavefront sensor, a holographic wavefront sensor, an optical field sensor, and a complex field sensor.

In one example, the wavefront sensor 23 is a shack-hartmann wavefront sensor. The shack-hartmann wavefront sensor typically includes a micro-lens array and an area array camera sensor. The area array camera sensor includes a plurality of imaging array units respectively corresponding to a plurality of micro-lenses in the micro-lens array. The plurality of imaging array units are configured to respectively display detection light respectively transmitted through the plurality of micro-lenses in the micro-lens array.

FIG. 3A illustrates an ideal wavefront pattern detected by a wavefront sensor in some embodiments according to the present disclosure. Referring to FIG. 3A, a detection light having an ideal wavefront is received by the wavefront sensor. The plurality of micro-lenses in the micro-lens array focus the detection light respectively onto central points of the plurality of imaging array units in the area array camera sensor. The focusing points on the plurality of imaging array units in the area array camera sensor are uniformly distributed throughout the area array camera sensor. Optionally, the plurality of micro-lenses in the micro-lens array focus the detection light respectively onto other relevant points (e.g., in corners or along an edge) of the plurality of imaging array units in the area array camera sensor, however, the focusing points on the plurality of imaging array units in the area array camera sensor are uniformly distributed throughout the area array camera sensor.

FIG. 3B illustrates an aberrated wavefront pattern detected by a wavefront sensor in some embodiments according to the present disclosure. Referring to FIG. 3B, a detection light having an aberrated wavefront representing the imaging distortion in the virtual image displayed by the virtual image display apparatus is received by the wavefront sensor. The focusing points on the plurality of imaging array units in the area array camera sensor are non-uniformly distributed throughout the area array camera sensor, indicating imaging distortion in the virtual image.

Referring to FIG. 1, in some embodiments, the wavefront sensor 23 is configured to transmit the aberrated wavefront pattern generated by the wavefront sensor 23 to the wavefront correction processor 24. In some embodiments, the wavefront correction processor 24 is configured to receive the wavefront aberration information from the wavefront sensor 23, and configured to adjust in real time the imaging illumination produced by the image source 21 to reduce the imaging distortion in the virtual image displayed by the virtual image display apparatus.

Various appropriate wavefront correction processors may be used in the present virtual image display apparatus. In some embodiments, the wavefront correction processor 24 includes a wavefront reconstruction processor, an aberration analysis processor, a correction coefficient calculation processor, and an image rendering processor. Optionally, the wavefront reconstruction processor is configured to convert an aberrated wavefront pattern generated by the wavefront sensor 23 into a reconstructed wavefront. Optionally, the aberration analysis processor is configured to calculate an aberration coefficient between the reconstructed wavefront and a reference wavefront (e.g., an ideal wavefront having an ideal wavefront pattern). The aberration coefficient represents a degree of aberration of the reconstructed wavefront as compared to the reference wavefront. Optionally, the correction coefficient calculation processor is configured to calculate an aberration correction coefficient (e.g., using an aberration correction algorithm) for adjusting a phase of the imaging illumination of the image source 21. Optionally, the image rendering processor is configured to calculate phase adjustment parameters based on the aberration correction coefficient, and transmit the phase adjustment parameters to the image source 21 for adjusting in real time the phase of the imaging illumination of the image source 21, thereby reducing the imaging distortion in the virtual image displayed by the virtual image display apparatus in real time.

In one example, the wavefront sensor 23 is a shack-hartmann wavefront sensor having a micro-lens array and an area array camera sensor as illustrated in FIG. 3B. The aberration coefficient between the reconstructed wavefront and a reference wavefront is determined based on deviations of focusing points on the plurality of imaging array units from reference focusing points for the reference wavefront. Optionally, the reference focusing points are uniformly distributed throughout the plurality of imaging array units of the area army camera sensor. Optionally, the reference focusing points are central points of the plurality of imaging array units. Optionally, the reference focusing points are corner points of the plurality of imaging array units. An aberration correction algorithm is then used to calculate the aberration correction coefficient.

In some embodiments, the aberration coefficient between the reconstructed wavefront and a reference wavefront is calculated based on spectral centroid shift (SCS) of focusing points on the plurality of imaging array units relative to the reference focusing points, thereby obtaining an aberration wavefront representing a difference between the reconstructed wavefront (e.g., the actual wavefront detected) and the reference wavefront (e.g., an ideal wavefront). The aberration wavefront may be understood to represent angles of the reconstructed wavefront deviating from the optical axis. Accordingly, the aberration wavefront can be expressed using equations containing wavefront coefficients. Optionally, the aberration wavefront is expressed as Zernike polynomials. Optionally, the aberration wavefront is expressed as Seidel Aberration. Wavefront coefficients for the aberration wavefront can then be calculated, and an appropriate aberration correction algorithm can be used to calculate the aberration correction coefficient. Examples of appropriate aberration correction algorithms include pure integral control, minimum beat control, linear quadratic Gaussian control based on Kalman filter, and so on.

The present virtual image display apparatus is capable of dynamically correcting aberrations (e.g., imaging distortion) in the virtual image displayed by the virtual image display apparatus in real time, by adjusting in real time the phase of the imaging illumination of the image source 21. The virtual image display apparatus achieves this function in part by transmitting and detecting in real time a detection light having an aberrated wavefront representing the imaging distortion in the virtual image displayed by the virtual image display apparatus. The virtual image display apparatus includes an optical relay configured to transmit the detection light having the aberrated wavefront representing imaging distortion, a wavefront sensor configured to detect wavefront aberration information from the detection light, and a wavefront correction processor configured to adjust in real time the imaging illumination produced by the image source to reduce the imaging distortion in real time.

Figure 4:
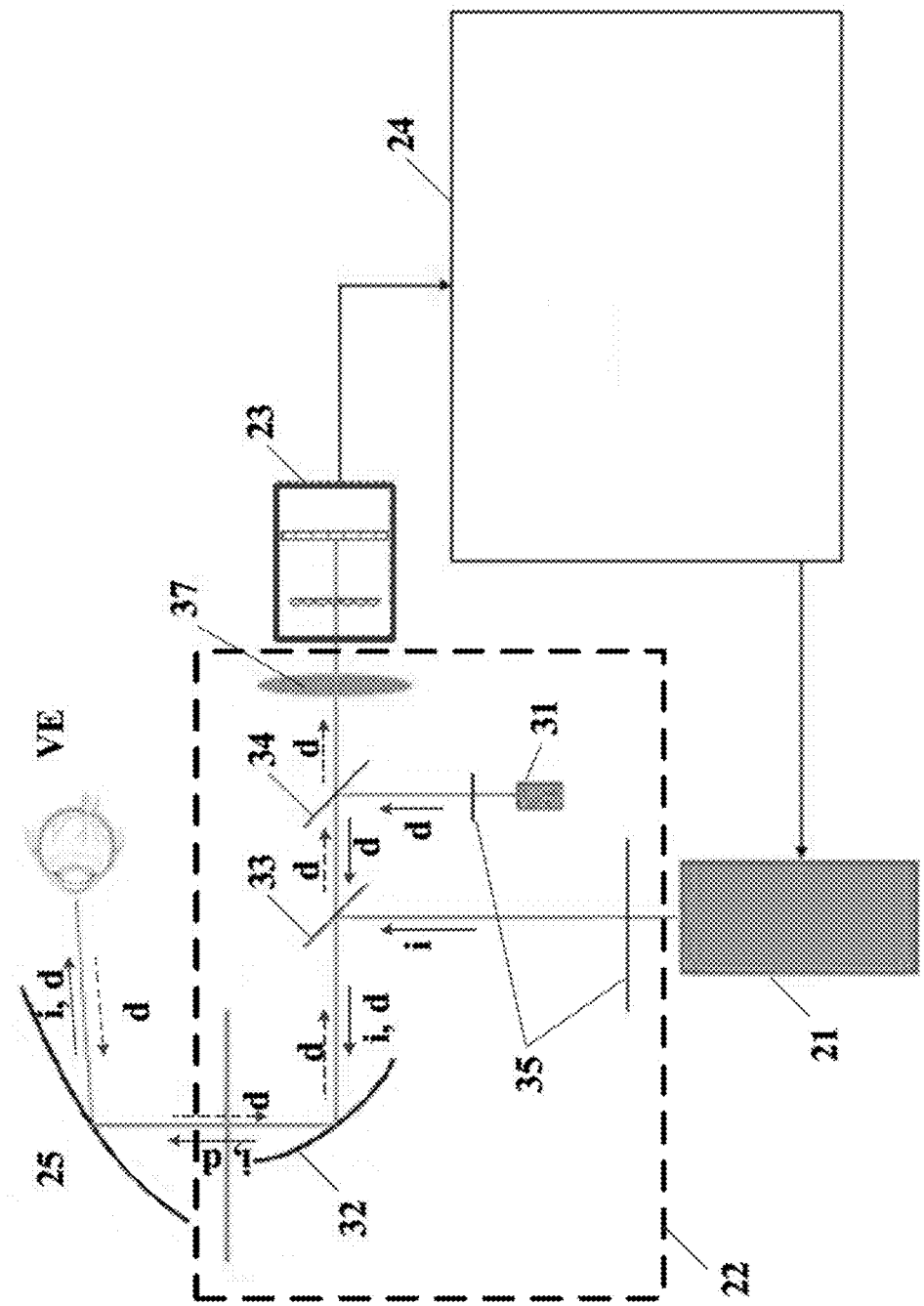
FIG. 4 is a schematic diagram illustrating the structure of a virtual image display apparatus in some embodiments according to the present disclosure.
Figure 5:
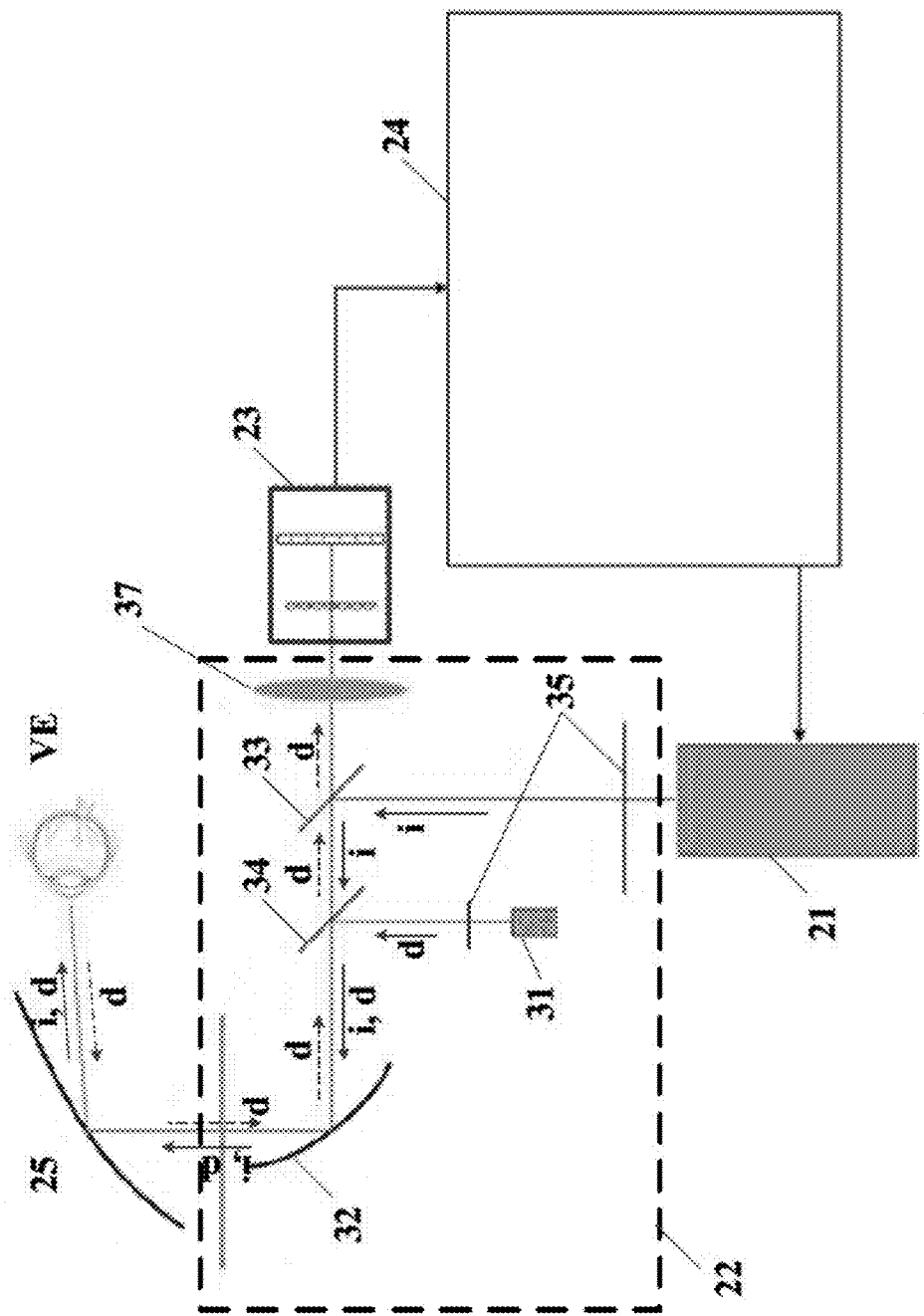
FIG. 5 is a schematic diagram illustrating the structure of a virtual image display apparatus in some embodiments according to the present disclosure.
Figure 6:
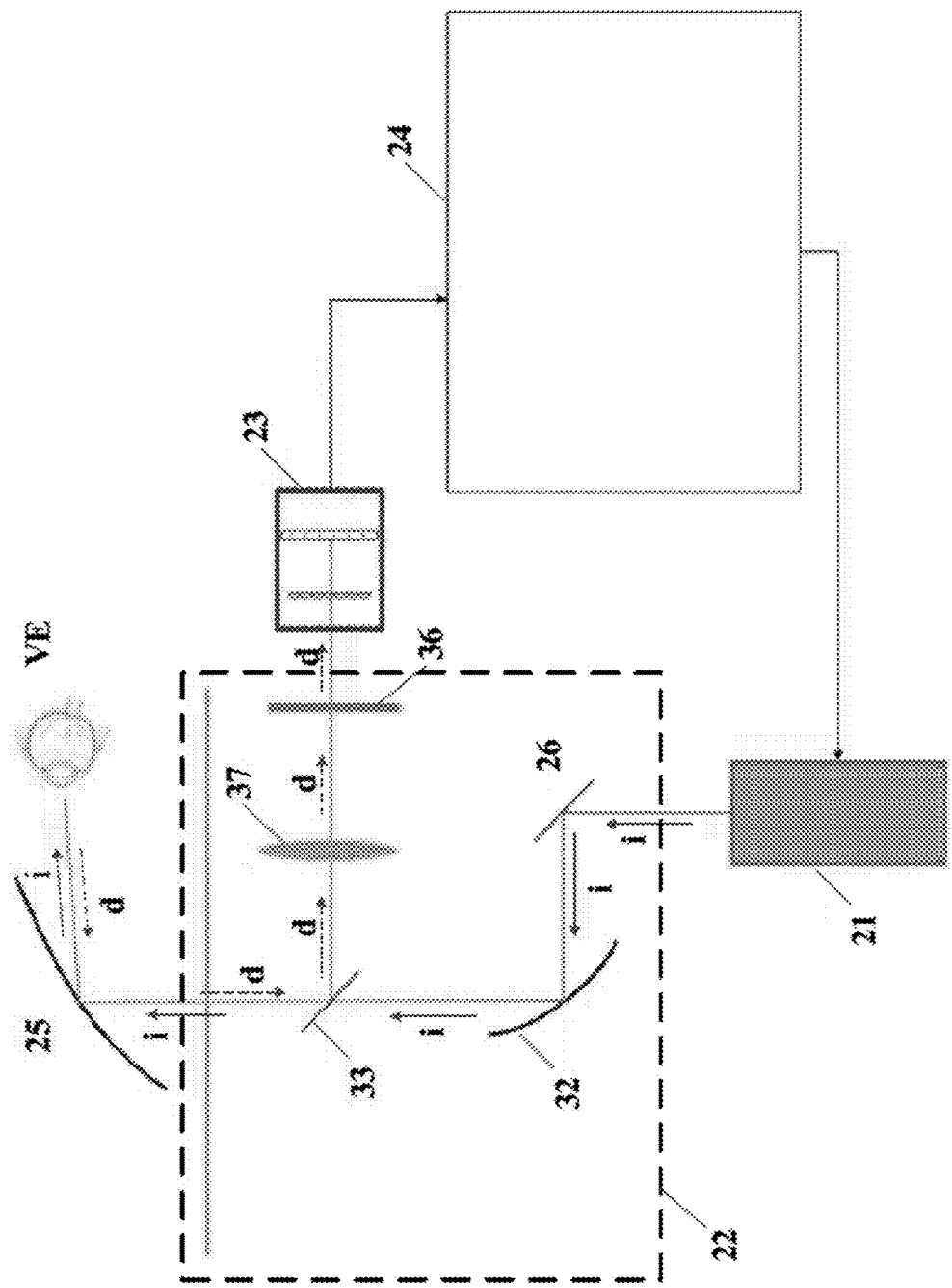
FIG. 6 is a schematic diagram illustrating the structure of a virtual image display apparatus in some embodiments according to the present disclosure.

In some embodiments, the optical relay includes a reflective mirror configured to reflect the imaging illumination from the image source to a viewer; and a dichroic mirror between the reflective mirror and the wavefront sensor, and configured to allow the detection light to be transmitted to the wavefront sensor and allow the imaging illumination from the image source to be transmitted to the viewer. FIGS. 4 to 6 are schematic diagrams illustrating the structures of virtual image display apparatuses in some embodiments according to the present disclosure. Referring to FIGS. 4 to 6, the optical relay 22 includes a reflective mirror 32, and a dichroic mirror 33 between the reflective mirror 32 and the wavefront sensor 23. The reflective mirror 32 is configured to reflect the imaging illumination i from the image source 21 to a viewer's eye VE. The dichroic mirror 33 is configured to allow a detection light d to be transmitted to the wavefront sensor 23 and allow the imaging illumination i from the image source 21 to be transmitted to the viewer's eye VE.

In some embodiments, and referring to FIG. 4 and FIG. 5, the dichroic mirror 33 is configured to reflect the imaging illumination i from the image source 21 to the reflective mirror 32; and configured to allow the detection light d to transmit through the dichroic mirror 33 (forward direction or backward direction). Specifically, the virtual image display apparatus in some embodiments further includes a detection light source 31 configured to produce a detection light d. The detection light source 31 is independent from the image source 21. For example, the image source 21 typically produces a visible light, e.g., red light, green light, blue light, and white light. In one example, the detection light source 31 is configured to produce light outside the visible light spectrum, e.g., a near infrared light or any other suitable light. Optionally, the detection light source 31 is configured to produce a visible light. Optionally, the emission angle of the detection light source 31 is set to be substantially the same as the emission angle of the image source 21, so that the light paths of the detection light d and the imaging illumination I are substantially the same. By having this design, the aberrated wavefront in the detection light d can be detected with an enhanced accuracy.

Referring to FIG. 4 and FIG. 5, in some embodiments, the detection light d from the detection light source 31 is reflected by the reflective mirror 32 and subsequently transmitted to the viewer's eye VE along a forward optical path (direction of which denoted using arrows of solid lines). Specifically, the reflective mirror 32 is configured to reflect the detection light d from the detection light source 31 along the forward optical path, the detection light d along the forward optical path being subsequently transmitted to the viewer's eye VE. The detection light d reflected by the viewer's eye VE is reflected by the reflective mirror 32 and subsequently transmitted to the wavefront sensor 23 along a backward optical path (direction of which denoted using arrows of dotted lines). Specifically, the reflective mirror 32 is configured to reflect the detection light d reflected by the viewer's eye VE along a backward optical path, the detection light d along the backward optical path being subsequently transmitted to the wavefront sensor 23. More specifically, along the forward optical path, the imaging illumination i produced by the image source 21 and the detection light d produced by the detection light source 31 are both reflected by the reflective mirror 32. The imaging illumination i and the detection light d are then reflected by the optical combiner 25 (windshield), and are transmitted to the viewer's eye VE along the forward optical path. The viewer's eye VE receives the imaging illumination i and the detection light d, and reflects at least a portion of the light back, along the backward optical path, to the optical combiner 25 to the reflective mirror 32. The backward optical path and the forward optical path are along reversed directions. Optionally, at least portions of the backward optical path and the forward optical path substantially overlap with each other except that the directionality are opposite to each other.

Referring to FIG. 4 and FIG. 5 again, the optical relay 22 in some embodiments further includes a beam splitter 34 configured to allow the detection light d from the detection light source 31 to be transmitted to the reflective mirror 32 and subsequently to the viewer's eye VE along the forward optical path, and configured to allow the detection light d from the viewer's eye VE and subsequently reflected by the reflective mirror 32 to be transmitted to the wavefront sensor 23 along the backward optical path. By having a combination of the beam splitter 34 and the dichroic mirror 33, the detection light d along the backward optical path can be introduced into the wavefront sensor 23.

In some embodiments, and referring to FIG. 4, the beam splitter 34 is between the dichroic mirror 33 and the wavefront sensor 23, and further, the beam splitter 34 is between the detection light source 31 and the dichroic mirror 33. Optionally, the dichroic mirror 33 is between the beam splitter 34 and the reflective mirror 32, and further, the dichroic mirror 33 is between the image source 21 and the reflective mirror 32. In this setup, the dichroic mirror 33 is configured to reflect the imaging illumination i produced by the image source 21 to the reflective mirror 32 along the forward optical path, configured to allow the detection light d reflected by the beam splitter 34 to transmit through the dichroic mirror 33 to the reflective mirror 32 along the forward optical path, and further configured to allow the detection light d reflected by the reflective mirror 32 to transmit through the dichroic mirror 33 to the beam splitter 34 along the backward optical path.

In some embodiments, the dichroic mirror 33 is configured to selectively allowing light in a first wavelength range to transmit through, while selectively reflecting light in a second wavelength range, thereby differentiate the imaging illumination i and the detection light d. Optionally, the dichroic mirror 33 is configured to selectively allowing the detection light d reflected by the reflective mirror 32 to transmit through the dichroic mirror 33 to the beam splitter 34 along the backward optical path (as shown in FIG. 4), while the imaging illumination i is reflected by the dichroic mirror 33. Optionally, the dichroic mirror 33 is configured to selectively reflecting the detection light d reflected by the reflective mirror 32 to the wavefront sensor 23, while the imaging illumination i is allowed to pass through.

In some embodiments, the beam splitter 34 is configured to reflect the detection light d from the detection light source 31 to the dichroic mirror 33 (and subsequently to the reflective mirror 32) along the forward optical path, and configured to allow the detection light d from the dichroic mirror 33 to transmit through the beam splitter 34 to the wavefront sensor 23 along the backward optical path, as shown in FIG. 4.

In some embodiments, and referring to FIG. 5, the beam splitter 34 is between the dichroic mirror 33 and the reflective mirror 32, and further, the beam splitter 34 is between the detection light source 31 and the reflective mirror 32. Optionally, the dichroic mirror 33 is between the beam splitter 34 and the wavefront sensor 23, and further, the dichroic mirror 33 is between the image source 21 and the beam splitter 34. In this setup, the beam splitter 34 is configured to allow the imaging illumination i reflected by the dichroic mirror 33 to transmit through the beam splitter 34 to the reflective mirror 32 (and eventually to the viewer's eye VE) along the forward optical path, configured to reflect the detection light d produced by the detection light source 31 to the reflective mirror 32 (and eventually to the viewer's eye VE) along the forward optical path, and configured to allow the detection light d reflected by the reflective mirror 32 to transmit through the beam splitter 34 to the dichroic mirror 33 along the backward optical path. Optionally, the dichroic mirror 33 is configured to reflect the imaging illumination i from the image source 21 to the beam splitter 34 along the forward optical path, and configured to allow the detection light d from the beam splitter 34 to transmit through the dichroic mirror 33 to the wavefront sensor 23 along the backward optical path.

In some embodiments, and referring to FIG. 4 and FIG. 5, the optical relay 22 further includes one or more optical isolators 35 to prevent the image source 21 and the detection light source 31 from interference by reflected light along the backward optical path. Optionally, the optical relay 22 includes one of the one or more optical isolators 35 between the detection light source 31 and the beam splitter 34. Optionally, the optical relay 22 includes one of the one or more optical isolators 35 between the image source 21 and the dichroic mirror 33.

In some embodiments, the detection light d and the imaging illumination i have different wavelengths. Optionally, the imaging illumination i has a wavelength in a first wavelength range, and the detection light d has a wavelength in a second wavelength range non-overlapping with the first wavelength range. Optionally, the imaging illumination i is in visible light spectrum. Optionally, the detection light d is a near infrared light.

In some embodiments, and referring to FIG. 6, the dichroic mirror 33 is configured to reflect the detection light d to the wavefront sensor 23, and configured to allow the imaging illumination i to transmit through the dichroic mirror 33. In this setup, optionally, an independent detection light source is not absolutely required. Optionally, the virtual image display apparatus includes both an image source 21 and a detection light source. Optionally, the virtual image display apparatus does not include a separate detection light source (only an image source 21 is sufficient), and the detection light d is a light beam of the imaging illumination i reflected by the viewer's eye VE. As shown in FIG. 6, the imaging illumination i from the image source 21 is reflected by the reflective mirror 32, transmits through the dichroic mirror 33, and is subsequently transmitted to the viewer's eye VE along a forward optical path. Specifically, the reflective mirror 32 is configured to reflect the imaging illumination i from the image source 21 along the forward optical path to the dichroic mirror 33, the dichroic mirror 33 is configured to allow the imaging illumination i along the forward optical path to transmit through the dichroic mirror 33, the detection light d along the forward optical path being subsequently transmitted to the viewer's eye VE. The detection light d reflected by the viewer's eye VE is reflected by the dichroic mirror 33 and subsequently transmitted to the wavefront sensor 23 along a backward optical path. Specifically, the dichroic mirror 33 is configured to reflect the detection light d reflected by the viewer's eye VE along a backward optical path, the detection light d along the backward optical path being subsequently transmitted to the wavefront sensor 23.

In some embodiments, the optical relay 22 further includes a plane mirror 26, which reflects the imaging illumination i produced by the image source 21 to the reflective mirror 32 (a curved mirror). Optionally, the imaging illumination i produced by the image source 21 is directly reflected by the reflective mirror 32, e.g., without an intermediate structure such as a plane mirror 26. The dichroic mirror 33 is configured to allow the illumination i produced by the image source 21 to transmit through the dichroic mirror 33 along the forward optical path. The imaging illumination i is then reflected by the optical combiner 25 (windshield), and is transmitted to the viewer's eye VE along the forward optical path. The viewer's eye VE receives the imaging illumination i, and reflects at least a portion of the light back, along the backward optical path. The light reflected by the viewer's eye VE functions as the detection light d in this setup. The backward optical path and the forward optical path are along reversed directions. Optionally, at least portions of the backward optical path and the forward optical path substantially overlap with each other except that the directionality are opposite to each other. Subsequently, the dichroic mirror 33 is configured to reflect the detection light d reflected by the viewer's eye VE to the wavefront sensor 23.

Referring to FIG. 6 again, the optical relay 22 in some embodiments further includes an optical density filter 36 between the dichroic mirror 33 and the wavefront sensor 23. Optionally, the optical density filter 36 is configured to adjust a light intensity of the detection light d transmitted to the wavefront sensor 23 along the backward optical path. In some embodiments, the image source 21 adaptively changes a light intensity of the imaging illumination i produced by the image source 21 based on a change in an ambient light intensity. Accordingly, a light intensity of the detection light d reflected by the viewer's eye also undergoes a change corresponding to the change of the imaging illumination i produced by the image source 21. The variation of the light intensity of the detection light d leads to inaccuracy in the detection of wavefront aberration information from the detection light d. By having an optical density filter 36, a light intensity of the detection light d sensed by the wavefront sensor 23 can be maintained at a stable level.

In some embodiments, and referring to FIGS. 4 to 6, the optical relay 22 further includes a lens 37 configured to adjust a focus point of the detection light d on the wavefront sensor 23. By having a lens to focus the detection light d on the wavefront sensor 23, the virtual image display apparatus can be assembled with a greater flexibility. For example, the virtual image display apparatus can be made mom compact with the detection light d being focused on a position closer to the dichroic mirror 33. Optionally, the lens 37 is a concave lens. Optionally, the lens 37 is a convex lens. A focal length of the lens 37 can be chosen to fit the specific design of the virtual image display apparatus.

Figure 7:
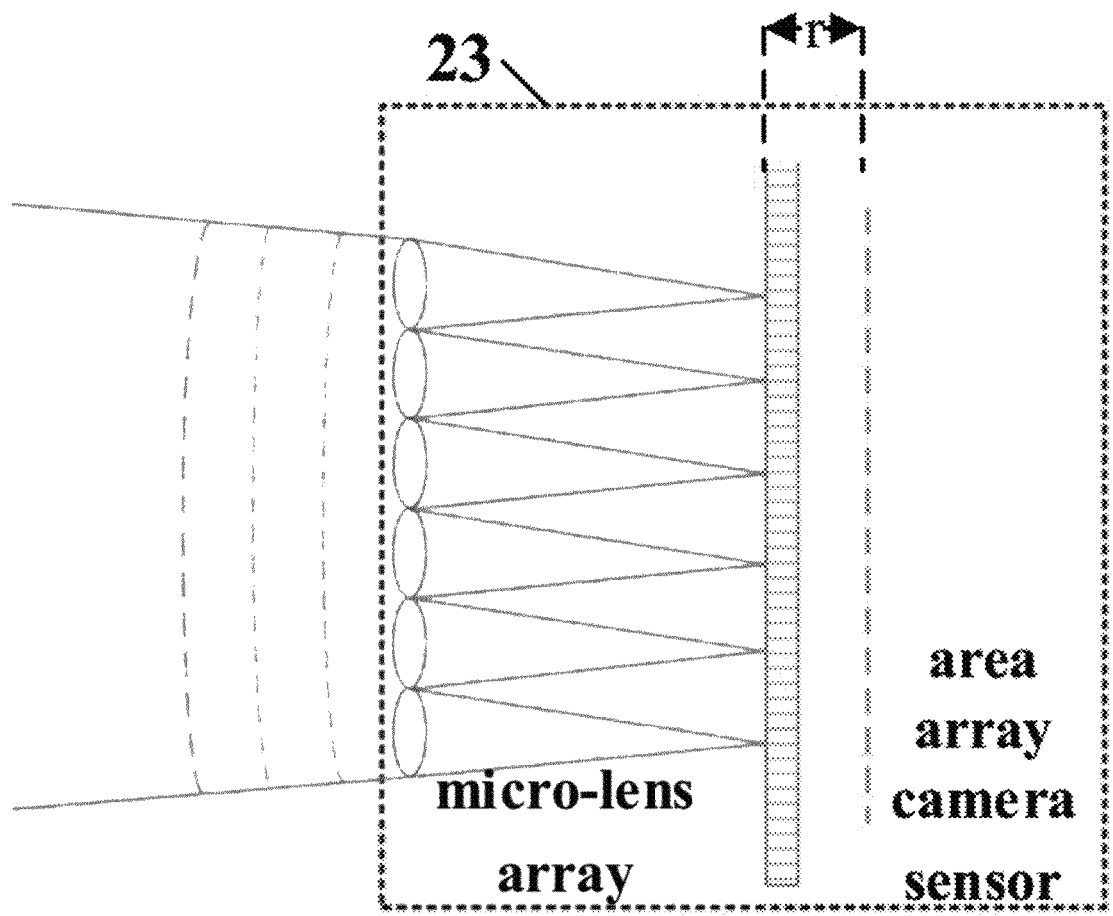
FIG. 7 is a schematic diagram illustrating the structure of a wavefront sensor in some embodiments according to the present disclosure.

In some embodiments, the wavefront sensor 23 can be adaptively moved to receive the detection light. FIG. 7 is a schematic diagram illustrating the structure of a wavefront sensor in some embodiments according to the present disclosure. Referring to FIG. 7, the area array camera sensor of the wavefront sensor 23 can be moved with a range r. As long as the focus point of the detection light resides at a position within the range r, the area array camera sensor of the wavefront sensor 23 can receive a focused detection light accurately. Optionally, the virtual image display apparatus does not include a lens for focusing the detection light on the wavefront sensor 23.

The present virtual image display apparatus, by having the wavefront sensor to automatically detect imaging distortion and the wavefront correction processor to automatically adjust in real time the imaging illumination produced by the image source to reduce the imaging distortion, the image source can dynamically adjust aberrations of the image. The present virtual image display apparatus can be easily adapted to various types of windshields of different models, thus can be used as a generic virtual image display apparatus suitable for vehicles of different models. The viewer can view a virtual image with high accuracy without significant imaging distortion, obviating the need for installing expensive and complicated components such as special-surface aspheric reflection mirrors or free-form surface reflection mirrors.

In another aspect, the present disclosure provides a vehicle having the virtual image display apparatus. As used herein, the term "vehicle" is understood to include an automobile, a bicycle, an aircraft, a watercraft, and an amphibious vehicle.

Figure 8:
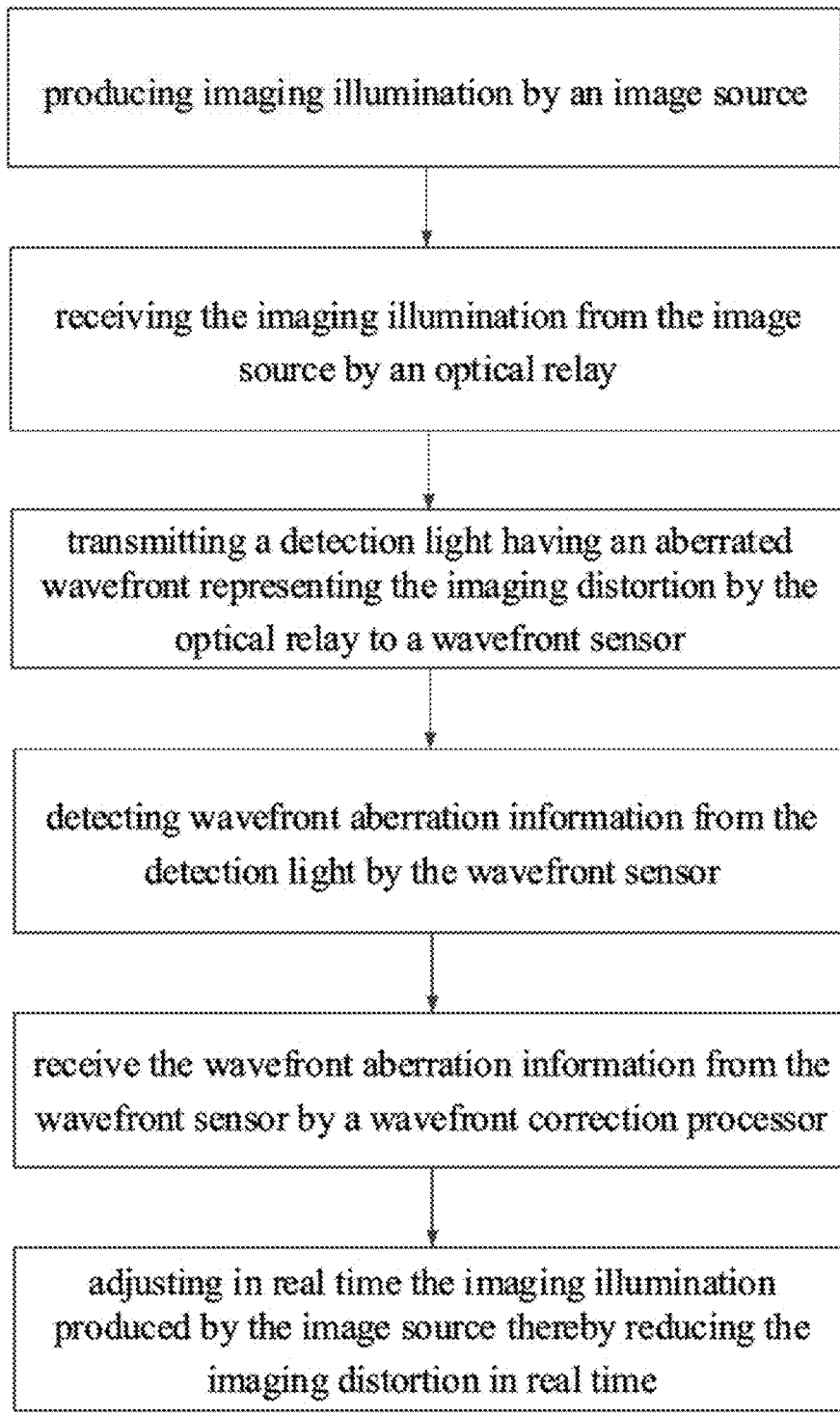
FIG. 8 is a flow chart illustrating a method for reducing in real time imaging distortion in a virtual image displayed by a virtual image display apparatus in some embodiments according to the present disclosure.

In another aspect, the present disclosure provides a method for reducing in real time imaging distortion in a virtual image displayed by a virtual image display apparatus. FIG. 8 is a flow chart illustrating a method for reducing in real time imaging distortion in a virtual image displayed by a virtual image display apparatus in some embodiments according to the present disclosure. Referring to FIG. 8, the method in some embodiments includes producing imaging illumination by an image source; receiving the imaging illumination from the image source by an optical relay; transmitting a detection light having an aberrated wavefront representing the imaging distortion by the optical relay to a wavefront sensor; detecting wavefront aberration information from the detection light by the wavefront sensor; receive the wavefront aberration information from the wavefront sensor by a wavefront correction processor, and adjusting in real time the imaging illumination produced by the image source thereby reducing the imaging distortion in real time.

In some embodiments, the optical relay is configured to construct an optical path for light transmission in the virtual image display apparatus. The optical path includes a forward optical path and a backward optical path. Along the forward optical path, the optical relay is configured to transmit an imaging illumination produced by an image source to produce an intermediate image, which is reflected by an optical combiner (e.g., the windshield) to present a virtual image to a viewer's eye. Along the backward optical path, the optical relay is configured to transmit the detection light having an aberrated wavefront representing imaging distortion in the virtual image displayed by the virtual image display apparatus to the wavefront sensor. Optionally, the detection light is generated by a detection light source independent from the image source. Optionally, the detection light is a light beam of the imaging illumination reflected by the viewer's eye.

In some embodiments, the method further includes, subsequent to detecting wavefront aberration information from the detection light by the wavefront sensor, converting the detection light into an aberrated wavefront pattern, and transmitting the aberrated wavefront pattern to the wavefront correction processor. Optionally, the wavefront aberration information includes the aberrated wavefront pattern. Optionally, the step of transmitting the aberrated wavefront pattern to the wavefront correction processor includes first converting the aberrated wavefront pattern into an aberrated wavefront pattern data, and transmitting the aberrated wavefront pattern data to the wavefront correction processor. The data transmission between the wavefront sensor and the wavefront correction processor can be performed by wire or wirelessly.

Various appropriate wavefront sensors may be used in the present virtual image display apparatus. Examples of appropriate wavefront sensors include a shack-hartmann wavefront sensor, a holographic wavefront sensor, an optical field sensor, and a complex field sensor.

As used herein, the term "wavefront aberration" is used to mean the spatial variation of the distance between the actual light wavefront from a central light point and a reference surface, e.g. its ideal spherical configuration. For instance, the sphere surface of the ideal wavefront is used as the spatial reference system. As the reference system for measuring the aberration, a plane is chosen when the ideal wavefront to be measured is plane. The wavefront aberration pattern refers to a light wave pattern generated based on the actual detection light. Light can be considered as a propagating electromagnetic wave, and the continuous equiphase surface of the continuity of the light wave can be referred to as a wave front. Therefore, wavefront is a surface rather than a line. The wavefront aberration pattern is relative to the ideal wavefront pattern. In reality, the actual wavefront being measured typically does not have an ideal wavefront pattern. When the ideal wavefront enters the human eye, there is no aberration and it can be well converged on a focusing point on the retina. Due to the presence of aberrations, the wavefront pattern generated by the detection light deviates from the ideal wavefront image (see, e.g., a comparison between FIG. 3A and FIG. 3B). Referring to FIG. 3A and FIG. 3B, the detection light is received by the micro-lens array. The micro-lens array focuses the detection light onto the area array camera sensor. The area array camera sensor records the positions of the detection light on an imaging plate in the area array camera sensor, thereby generating the wavefront aberration pattern. The imaging plate in the area array camera sensor is pre-recorded with positions corresponding to an ideal wavefront pattern. Accordingly, the wavefront aberration pattern is obtained by comparing the positions of the actual detection light on an imaging plate in the area array camera sensor and the positions corresponding to the ideal wavefront pattern.

In some embodiments, the method further includes calculating aberrations between the wavefront aberration pattern and a reference pattern by the wavefront correction processor. Optionally, the wavefront correction processor is configured to calculate an aberration coefficient representing the aberrations. In some embodiments, the wavefront correction processor includes a wavefront reconstruction processor, an aberration analysis processor, a correction coefficient calculation processor, and an image rendering processor. Optionally, the wavefront reconstruction processor is configured to convert an aberrated wavefront pattern generated by the wavefront sensor into a reconstructed (actual) wavefront. Optionally, the aberration analysis processor is configured to calculate an aberration coefficient between the reconstructed wavefront and a reference wavefront (e.g., an ideal wavefront having an ideal wavefront pattern). The aberration coefficient represents a degree of aberration of the reconstructed wavefront as compared to the reference wavefront. Optionally, the aberration coefficient between the reconstructed wavefront and a reference wavefront is calculated based on spectral centroid shift (SCS) of focusing points on the plurality of imaging array units relative to the reference focusing points, thereby obtaining an aberration wavefront representing a difference between the reconstructed wavefront (e.g., the actual wavefront detected) and the reference wavefront (e.g., an ideal wavefront). The aberration wavefront may be understood to represent angles of the reconstructed wavefront deviating from the optical axis. Accordingly, the aberration wavefront can be expressed using equations containing wavefront coefficients. Optionally, the aberration wavefront is expressed as Zernike polynomials. Optionally, the aberration wavefront is expressed as Seidel Aberration. Wavefront coefficients for the aberration wavefront can then be calculated. In one example, the aberration wavefront is expressed as Zernike polynomials. For the set of polynomials, from the optical point of view, each item can be expressed as mutually independent optical aberrations, such as translational terms, tilt terms, defocus terms, astigmatism terms, enthalpy difference items, spherical aberration terms, and so on. Different items discussed above may be assigned with different weights, thereby deriving various items of coefficients for determining the wavefront coefficients. Optionally, the wavefront coefficient refers to a certain item of wavefront coefficient. Optionally, the wavefront coefficient refers to a group of wavefront coefficients.

Optionally, the correction coefficient calculation processor is configured to calculate an aberration correction coefficient for adjusting a phase of the imaging illumination of the image source. Any appropriate aberration correction algorithm may be used to calculate the aberration correction coefficient. Examples of appropriate aberration correction algorithms include pure integral control, minimum beat control, linear quadratic Gaussian control based on Kalman filter, and so on. Optionally, the aberration correction coefficient refers to a certain item of aberration correction coefficient corresponding to one item of wavefront coefficient. Optionally, the aberration correction coefficient refers to a group of aberration correction coefficients.

Optionally, the image rendering processor is configured to calculate phase adjustment parameters based on the aberration correction coefficient, and transmit the phase adjustment parameters to the image source for adjusting in real time the phase of the imaging illumination of the image source, thereby reducing the imaging distortion in the virtual image displayed by the virtual image display apparatus in real time. Optionally, the image rendering processor may send the phase adjustment parameters to the image source, and then the image source performs an adjustment operation of phase of the imaging illumination of the image source. Optionally, the image rendering processor sends instructions on how to calculate the phase adjustment parameters to the image source, and then the image source calculates the phase adjustment parameters, and performs an adjustment operation of phase of the imaging illumination of the image source.

In some embodiments, the image source is configured to adjust in real time the imaging illumination produced by the image source thereby reducing the imaging distortion in real time. Optionally, the image rendering processor is disposed integrated with other components of the wavefront correction processor. Optionally, the image rendering processor is integrated into the image source.

In the present method, imaging distortion is automatically detected by the wavefront sensor, the imaging illumination produced by the image source is automatically adjusted in real time by the wavefront correction processor, the aberrations of the image can be dynamically adjusted in real time, e.g., by the image source. The present method makes it possible to easily adapt the virtual image display apparatus to various types of windshields of different vehicle models, making it possible to using the virtual image display apparatus as a generic virtual image display apparatus suitable for vehicles of different models. The viewer can view a virtual image with high accuracy without significant imaging distortion, obviating the need for installing expensive and complicated components such as special-surface aspheric reflection mirrors or free-form surface reflection mirrors.

In some embodiments, the method further includes converting an aberrated wavefront pattern generated by the wavefront sensor into a reconstructed wavefront by a wavefront reconstruction processor; calculating an aberration coefficient between the reconstructed wavefront and a reference wavefront by an aberration analysis processor; calculating an aberration correction coefficient for adjusting a phase of the imaging illumination of the image source by a correction coefficient calculation processor, and calculating phase adjustment parameters based on the aberration correction coefficient by an image rendering processor, and transmitting the phase adjustment parameters to the image source for adjusting in real time the phase of the imaging illumination of the image source, thereby reducing the imaging distortion in in real time.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A virtual image display apparatus, comprising:
   an image source configured to produce imaging illumination;
   an optical relay configured to receive the imaging illumination from the image source, and configured to transmit a detection light having an aberrated wavefront representing imaging distortion in a virtual image displayed by the virtual image display apparatus;
   a wavefront sensor configured to receive the detection light, and configured to detect wavefront aberration information from the detection light; and
   a wavefront correction processor configured to receive the wavefront aberration information from the wavefront sensor, and configured to adjust in real time the imaging illumination produced by the image source to reduce the imaging distortion in real time;
   wherein the detection light is transmitted to a viewer's eye along a forward optical path, and is reflected by the viewer's eye; and
   the detection light reflected by the viewer's eye along a backward optical path is transmitted to the wavefront sensor.

2. The virtual image display apparatus of claim 1, wherein the optical relay comprises:
   a reflective mirror configured to reflect the imaging illumination from the image source to the viewer's eye; and
   a dichroic mirror between the reflective mirror and the wavefront sensor, and configured to allow the detection light to be transmitted to the wavefront sensor and allow the imaging illumination from the image source to be transmitted to the viewer's eye.

3. The virtual image display apparatus of claim 2, wherein the dichroic mirror is configured to reflect the imaging illumination from the image source to the viewer's eye; and configured to allow the detection light to transmit through the dichroic mirror.

4. The virtual image display apparatus of claim 3, further comprising a detection light source configured to produce a detection light, the detection light source being independent from the image source;
   wherein the reflective mirror is configured to reflect the detection light from the detection light source along the forward optical path to the viewer's eye; and
   the reflective mirror is configured to reflect the detection light reflected by the viewer's eye along the backward optical path to the wavefront sensor.

5. The virtual image display apparatus of claim 4, wherein the optical relay further comprises a beam splitter configured to allow the detection light from the detection light source to be transmitted to the reflective mirror and subsequently to the viewer's eye along the forward optical path, and configured to allow the detection light from the viewer's eye and subsequently reflected by the reflective mirror to be transmitted to the wavefront sensor along the backward optical path.

6. The virtual image display apparatus of claim 5, wherein the beam splitter is between the dichroic mirror and the wavefront sensor; and
   the dichroic mirror is between the beam splitter and the reflective mirror.

7. The virtual image display apparatus of claim 6, wherein the dichroic mirror is configured to allow the detection light reflected by the beam splitter to transmit through the dichroic mirror to the reflective mirror along the forward optical path, and configured to allow the detection light reflected by the reflective mirror to transmit through the dichroic mirror to the beam splitter along the backward optical path; and the beam splitter is configured to reflect the detection light from the detection light source to the dichroic mirror along the forward optical path, and configured to allow the detection light from the dichroic mirror to transmit through the beam splitter to the wavefront sensor along the backward optical path.

8. The virtual image display apparatus of claim 5, wherein the beam splitter is between the dichroic mirror and the reflective mirror; and the dichroic mirror is between the beam splitter and the wavefront sensor.

9. The virtual image display apparatus of claim 8, wherein the beam splitter is configured to allow the imaging illumination reflected by the dichroic mirror to transmit through the beam splitter to the reflective mirror along the forward optical path, and configured to allow the detection light reflected by the reflective mirror to transmit through the beam splitter to the dichroic mirror along the backward optical path; and the dichroic mirror is configured to reflect the imaging illumination from the image source to the beam splitter along the forward optical path, and configured to allow the detection light from the beam splitter to transmit through the dichroic mirror to the wavefront sensor along the backward optical path.

10. The virtual image display apparatus of claim 5, wherein the optical relay further comprises an optical isolator between the detection light source and the beam splitter.

11. The virtual image display apparatus of claim 4, wherein the detection light source is configured to produce a near infra-red light as the detection light.

12. The virtual image display apparatus of claim 2, wherein the dichroic mirror is configured to reflect the detection light to the wavefront sensor and configured to allow the imaging illumination to transmit through the dichroic mirror.

13. The virtual image display apparatus of claim 12, wherein the detection light is a light beam of the imaging illumination reflected by the viewer's eye;

the reflective mirror is configured to reflect the imaging illumination from the image source along the forward optical path to the dichroic mirror, the dichroic mirror is configured to allow the imaging illumination along the forward optical path to transmit through the dichroic mirror to the viewer's eye; and the dichroic mirror is configured to reflect the detection light reflected by the viewer's eye along the backward optical path to the wavefront sensor.

14. The virtual image display apparatus of claim 12, wherein the optical relay further comprises an optical density filter between the dichroic mirror and the wavefront sensor, the optical density filter configured to adjust a light intensity of the detection light transmitted to the wavefront sensor.

15. The virtual image display apparatus of claim 2, wherein the optical relay further comprises an optical isolator between the image source and the dichroic mirror.

16. The virtual image display apparatus of claim 1, wherein the optical relay further comprises a lens configured to adjust a focus point of the detection light on the wavefront sensor.

17. The virtual image display apparatus of claim 1, wherein the wavefront sensor comprises one or a combination of a shack-hartmann wavefront sensor, a holographic wavefront sensor, an optical field sensor, and a complex field sensor.

18. The virtual image display apparatus of claim 1, wherein the wavefront correction processor comprises:

a wavefront reconstruction processor configured to convert an aberrated wavefront pattern generated by the wavefront sensor into a reconstructed wavefront;

an aberration analysis processor configured to calculate an aberration coefficient between the reconstructed wavefront and a reference wavefront;

a correction coefficient calculation processor configured to calculate an aberration correction coefficient for adjusting a phase of the imaging illumination of the image source; and an image rendering processor configured to calculate phase adjustment parameters based on the aberration correction coefficient, and transmit the phase adjustment parameters to the image source for adjusting in real time the phase of the imaging illumination of the image source, thereby reducing the imaging distortion in in real time.

19. A vehicle, comprising the virtual image display apparatus of claim 1.

20. A method for reducing in real time imaging distortion in a virtual image displayed by a virtual image display apparatus, comprising:

producing imaging illumination by an image source;

receiving the imaging illumination from the image source by an optical relay;

transmitting a detection light having an aberrated wavefront representing imaging distortion by the optical relay to a wavefront sensor;

detecting wavefront aberration information from a detection light by the wavefront sensor;

receive the wavefront aberration information from the wavefront sensor by a wavefront correction processor; and adjusting in real time the imaging illumination produced by the image source thereby reducing the imaging distortion in real time;

wherein the detection light is transmitted to a viewer's eye along a forward optical path, and is reflected by the viewer's eye; and the detection light reflected by the viewer's eye along a backward optical path is transmitted to the wavefront sensor.

* * * * *